US007209337B2

(12) United States Patent

Bradfield et al.

(10) Patent No.: US 7,209,337 B2

(45) Date of Patent: Apr. 24, 2007

(54) ELECTRICAL THERMAL OVERSTRESS PROTECTION DEVICE

(75) Inventors: Michael D. Bradfield, Anderson, IN (US); Richard W. Huibregtse, Fishers, IN (US)

(73) Assignee: Remy International, Inc., Anderson, IN (US)

( * ) Notice: Subject to any disclaimer, the term of this patent is extended or adjusted under 35 U.S.C. 154(b) by 95 days.

(21) Appl. No.: 11/109,578

(22) Filed: Apr. 19, 2005

(65) Prior Publication Data

US 2006/0232905 A1 Oct. 19, 2006

(51) Int. Cl.
*H02H 5/04* (2006.01)

(52) U.S. Cl. .................................................... 361/105

(58) Field of Classification Search ................. 361/105
See application file for complete search history.

(56) References Cited

U.S. PATENT DOCUMENTS

| | | | | |
|---|---|---|---|---|
| 3,474,372 | A | 10/1969 | Davenport et al. | 337/1 |
| 3,764,765 | A | 10/1973 | Olashaw | 200/166 |
| 4,013,988 | A | 3/1977 | Holden | 337/89 |
| 4,086,558 | A | 4/1978 | Pejouhy et al. | 337/102 |
| 4,142,553 | A * | 3/1979 | Sakakibara et al. | 137/625.44 |
| 4,167,721 | A | 9/1979 | Senor et al. | 337/112 |
| 4,849,729 | A * | 7/1989 | Hofsass | 337/102 |
| 5,303,461 | A | 4/1994 | Okey et al. | 29/622 |
| 5,367,279 | A | 11/1994 | Sakai | 337/104 |
| 5,428,336 | A * | 6/1995 | Smith et al. | 337/365 |
| 5,745,022 | A | 4/1998 | Becher et al. | 337/104 |
| 5,757,261 | A | 5/1998 | Becher et al. | 337/377 |
| 6,057,751 | A | 5/2000 | Hung et al. | 337/377 |
| 6,181,233 | B1 | 1/2001 | Hofsass et al. | 337/377 |
| 6,249,211 | B1 | 6/2001 | Hofsaess | 337/377 |
| 6,300,860 | B1 | 10/2001 | Hofsass | 337/377 |
| 6,577,223 | B2 | 6/2003 | Takeda | 337/377 |
| 2001/0026207 | A1 | 10/2001 | Stenzel et al. | 337/104 |
| 2003/0214258 | A1* | 11/2003 | McIntosh | 315/291 |
| 2004/0257741 | A1 | 12/2004 | Cuny et al. | 361/115 |

FOREIGN PATENT DOCUMENTS

DE 3046571 A * 7/1982

* cited by examiner

*Primary Examiner*—Burton S. Mullins
*Assistant Examiner*—Ann T. Hoang
(74) *Attorney, Agent, or Firm*—Cantor Colburn LLP

(57) ABSTRACT

An electrical current overstress protection device for use with a power source and an overload protection switch comprising a main conductor member receiving current from the power source; a parallel conductor member connected to the main conductor member; and an area of localized increased electrical resistance located on the parallel conductor member and located proximate to the overload protection switch.

10 Claims, 4 Drawing Sheets

SIDE VIEW
W/O SWITCH

ELECTRICAL THERMAL OVERSTRESS PROTECTION DEVICE

TECHNICAL FIELD

This application relates generally to an electrical apparatus. More specifically, this application relates to thermal overstress protection for an electrical machine.

BACKGROUND

Circuit breakers are known to use two-layer or bimetallic strips wherein due to one metal having different expansive properties than the other metal, the combined bimetallic strip will bend in an arc for example and disconnect a circuit when heated by overload current.

A problem with heat triggered devices such as bimetallic strips is that the degree of control may not be fast enough or responsive enough for practical operations. Thus, a structure that has improved performance properties and improved responsiveness to heating and cooling is desirable.

BRIEF SUMMARY OF THE INVENTION

An embodiment may comprise an electrical current overstress protection device for use with a power source and an overload protection switch comprising a main conductor member receiving current from the power source; a parallel conductor member connected to the main conductor member; and an area of localized increased electrical resistance located on the parallel conductor member and located proximate to the overload protection switch.

An embodiment may also comprise an overcrank protection device for use with a power source, a starter motor and an overload protection switch comprising: a main conductor member for transferring current from the power source to the starter motor; a parallel conductor member connected with the main conductor member; an area of localized increased electrical resistance in comparison to the main conductor member located on the parallel conductor member and located in thermal contact with the overload protection switch;

wherein the main conductor member and the parallel conductor are structurally integral with each other and both members are sub-sections of one metallic unit; and wherein the parallel conductor member is structurally orientated to be substantially parallel to the main conductor member.

An embodiment may also comprise remotely locatable overcrank protection device for use with a power source, a starter motor and an overload protection switch comprising: a main conductor member for transferring current from the power source to the starter motor; a parallel conductor member located separately from the main conductor member and comprising at least one wire which is coiled around the overload protection switch thereby forming an area of localized increased electrical resistance in the parallel conductor member as compared to the main conductor member; and wherein the parallel connector is in thermal contact with the overload protection switch.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENT

Figure 1:
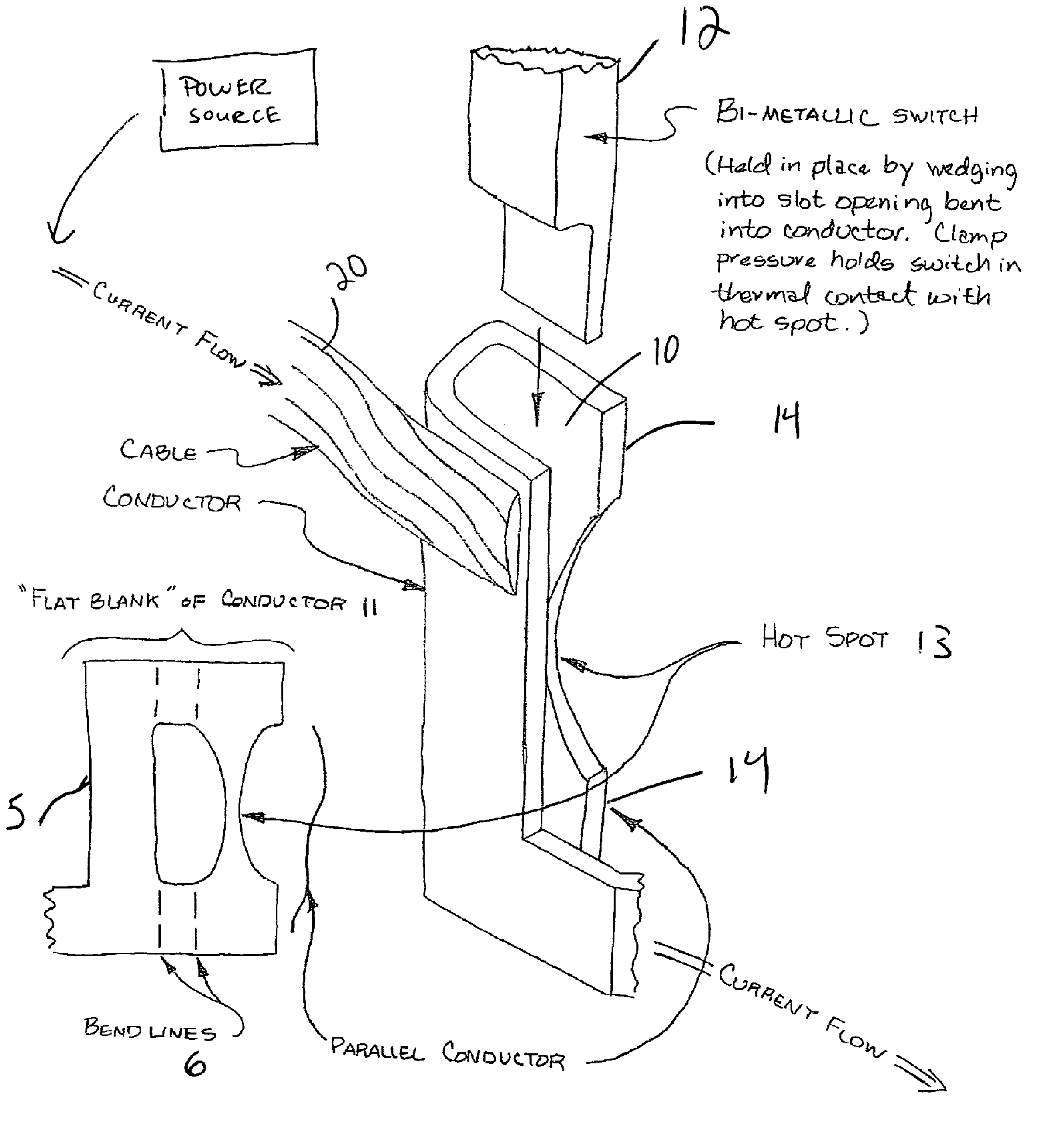
FIG. 1 is a perspective view of an embodiment with a parallel conductor.
Figure 2:
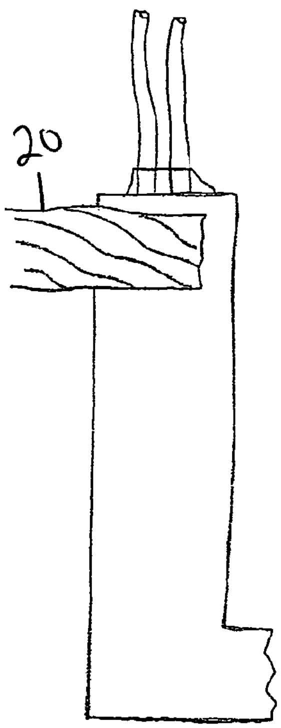
FIG. 2 is a side view of an embodiment with a parallel conductor.
Figure 3:
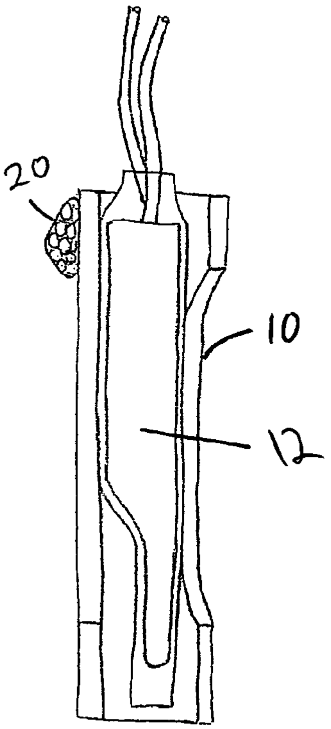
FIG. 3 is a front view of an embodiment with a parallel conductor.
Figure 4:
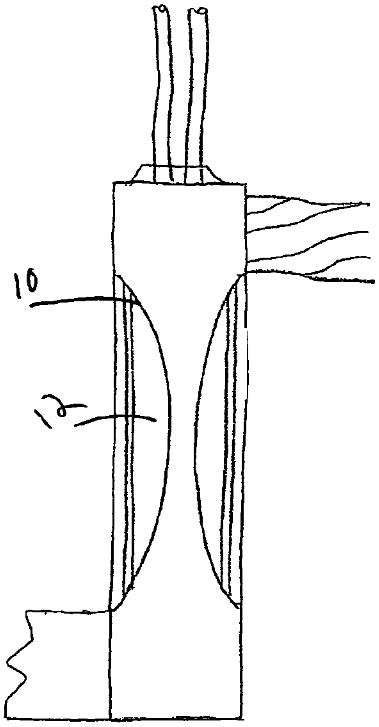
FIG. 4 is a side view of an embodiment with a parallel conductor.

Referring to FIGS. 1–5, an exemplary embodiment having a parallel conductor member 10 is shown. As shown in FIG. 1, the parallel conductor member 10 is formed as an additional section of a flat blank conductor 11 when stamped or manufactured. In this embodiment, by bending the main conductor member 5 along bend lines 6, the parallel conductor member is bent into place to become located substantially parallel to the main conductor member 5. Cable 20 is connected to main conductor member 5 and the current flow is as shown. Thereafter, a bimetallic switch 12 is wedged into a frictional mounting between the two members as shown in FIGS. 1 and 3. The bimetallic switch is actuated from heat generated by electrical current traveling through the conductors. However, in the present embodiment, the parallel conductor member 10 creates a parallel electrical path to the existing current carrying conductor, i.e., main conducting member 5, within the machine or apparatus. An advantage of this structure is that the parallel conductor member 10 heats up more rapidly and cools down in a more suitable time span than is achievable with any pre-existing surface or electrical conductor found within the existing machine or apparatus.

The embodiment shown in FIGS. 1–5, for example, may be used as a device to protect an electrical machine or apparatus such as an automotive starting motor from thermal overstress. It may also be used for many other electrical applications. For example, a bimetallic switch 12 may be thermally coupled to a selected electrical conductor that is related or correlated to the region of the electrical machine or apparatus of thermal overstress concern. For example, this embodiment may be used as a protection for starter motors against overcranking and hence, thermal overstress. In fact, the present embodiment may replace many existing overcrank protection (OCP) devices. However, the invention has the potential for widespread use in many devices such as with consumer appliances including units which may use a bimetallic strip for electrical thermal overstress protection, i.e., a refrigerator.

Figure 5:
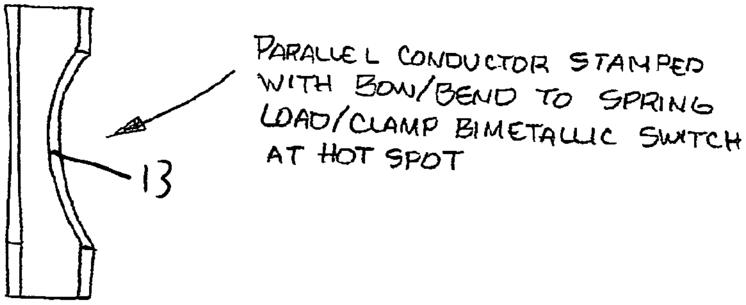
FIG. 5 is a front view of an embodiment with a parallel conductor.
Figure 7:
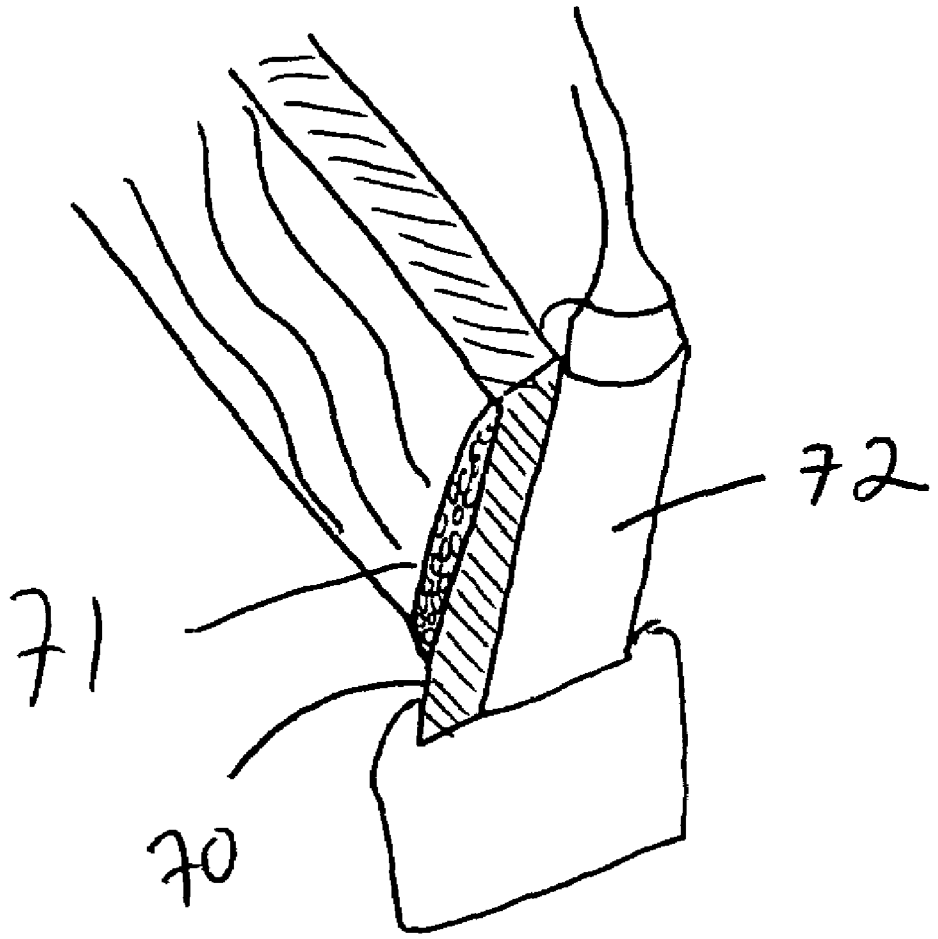
PRIOR ART FIG. 7
FIG. 7 is a perspective view of a prior art embodiment having a bi-metallic switch and no parallel conductor.

An advantageous feature of this embodiment is that it 'artificially' creates a "hot spot" 13 on the parallel conductor member 10 within the machine or apparatus that heats up more quickly and cools down more controllably when compared to existing standard shaped conductor surfaces. As shown in FIGS. 1 and 5, for example the hot spot 13 may be located at the tip of an arc section formed in the parallel conductor member 10. In contrast, in FIG. 7, prior art conductor 70 is of standard rectangular shape with no structural hot spot of greater resistance, and is wedged between wire 71 and bimetallic strip 72. Thus, the present embodiment with its hot spot 13 as shown in FIG. 1–5, provides a greater degree of safety from thermal overshoots and/or failure to engage/disengage at the appropriate temperature conditions than the standard device shown in FIG. 7. Also, by accomplishing this in a parallel electrical circuit, the existing machine or apparatus performance is not degraded by reducing the conductor cross section to create a hot spot 13.

The parallel conductor 10 can be configured in many ways, some examples of which are as described below.

One configuration would be to provide an electrically conductive leg parallel to an existing conductor as shown in FIGS. 1–5. The size and shape of this parallel leg (parallel conductor member 10) would be such that it would heat up more quickly than the main conductor member 5 or existing electrical conductor. This is accomplished by having a variable cross sectional area to form the hot spot 13 of the parallel conductor member 10 in the direction of the current flow. By necking down the middle area, i.e., forming the cut-out arced region of hot spot 13, between the two ends 14, the overall resistance is lower than if the entire area was necked down or reduced. For a given applied voltage, this causes a higher current to flow through the parallel conductor. At the necked down region of the hot spot 13 the resistance will be significantly higher than at the ends 14. This will cause a localized rapid heating effect. Many different shapes may be used for the hot spot so long as the result of creating a "hot spot" is achieved. A bimetallic switch 12 would be held in contact to this artificial hot spot. For example, in FIG. 5 the stamping is made with a bow or bend that biases or clamps the bimetallic switch 12 to the hot spot 13. By design, the parallel conductor member 14, in conjunction with the bimetallic switch 12 itself, is also designed to cool down at the proper rate such that the switch does not re-engage until the electric machine or apparatus is sufficiently cooled.

Figure 6:
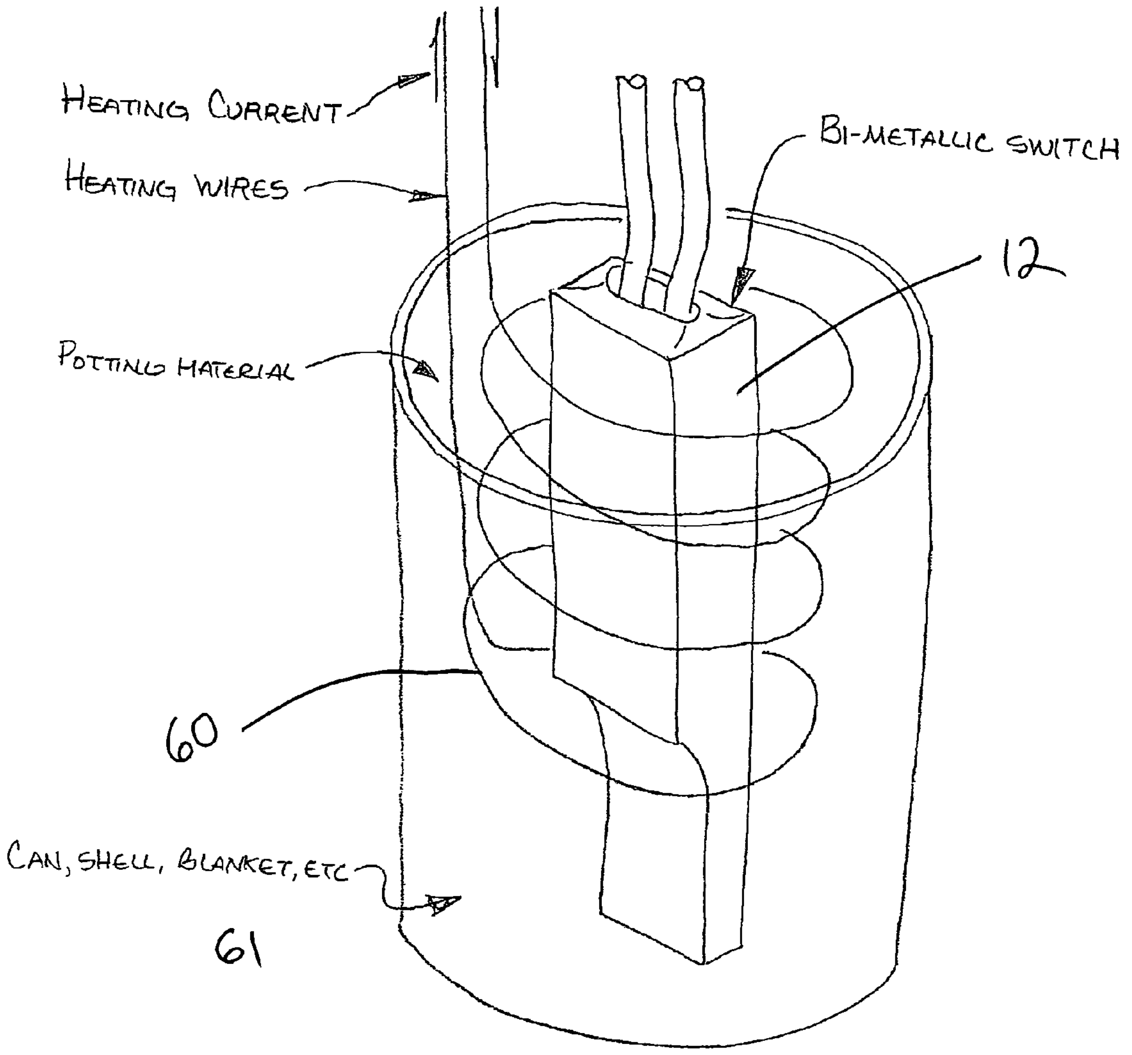
FIG. 6 is a perspective view of an embodiment with a bi-metallic switch surrounded by a heating enclosure.

Another configuration of the concept, as shown in FIG. 6, would be to wrap the bi-metallic switch with an electrical wire 60 to create a thermal blanket 61 around the switch. In such a configuration the bimetallic switch 12 could be located remotely from the starter motor or electrical apparatus. The only requirement would be that the current that flowed through the wire that surrounds the bi-metallic switch be correlated to the usage of the actual starter motor or apparatus itself. This configuration allows great freedom of design since the switch could be located at a position where more room may exist for the switch itself. It also allows the switch to be independent of the actual starter motor or apparatus design and thereby one switch may be used for multiple applications. This embodiment of a shaped and tailored conductor surface would also enable greater performance than the prior art shown in FIG. 7. It also possible to vary the width, length, and structure of the wire to increase or decrease resistance or to use multiple wires.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electrical current overstress protection device for use with a power source and an overload protection switch comprising:
- a main conductor member receiving current from the power source;
- a parallel conductor member structured together with the main conductor to be in the form of at least one coiled wire located around the overload protection switch;
- an area of localized increased electrical resistance located on the parallel conductor member and located proximate to the overload protection switch.

2. The device of claim 1 wherein:
- the area of localized increased electrical resistance comprises a reduced cross sectional area of conductor material in comparison to the main conductor member thereby being structured to become heated or cooled more quickly than the main conductor member.

3. The device of claim 1 wherein the main conductor member and the parallel conductor member are structured to at least partially surround the overload protection switch and to transfer heat to the overload protection switch.

4. The device of claim 1 wherein the overload protection switch is a bimetallic switch.

5. An overcrank protection device for use with a power source, a starter motor and an overload protection switch comprising:
- a main conductor member for transferring current from the power source to the starter motor;
- a parallel conductor member connected with the main conductor member;
- an area of localized increased electrical resistance in comparison to the main conductor member located on the parallel conductor member and located in thermal contact with the overload protection switch;
- wherein the main conductor member and the parallel conductor are structurally integral with each other and both members are sub-sections of one metallic unit;
- and wherein the parallel conductor member is structurally orientated to be substantially parallel to the main conductor member.

6. The device of claim 5 wherein the main conductor member and the parallel conductor member are structured to at least partially surround the overload protection switch.

7. The device of claim 5 wherein the main conductor member and the parallel conductor member are structured together to be in the form of one coiled wire located around the overload protection switch.

8. The device of claim 5 wherein the overload protection switch is a bimetallic switch.

9. A remotely locatable overcrank protection device for use with a power source, a starter motor and an overload protection switch comprising:
- a main conductor member for transferring current from the power source to the starter motor;
- a parallel conductor member located separately from the main conductor member and comprising at least one wire which is coiled around the overload protection switch thereby forming an area of localized increased electrical resistance in the parallel conductor member as compared to the main conductor member;
- and wherein the parallel connector is in thermal contact with the overload protection switch.

10. The device of claim 9 wherein the overload protection switch is a bimetallic switch.

* * * * *